(No Model.)
C. W. WHEELER.
ATTACHMENT FOR LAWN MOWERS.
No. 532,300. Patented Jan. 8, 1895.
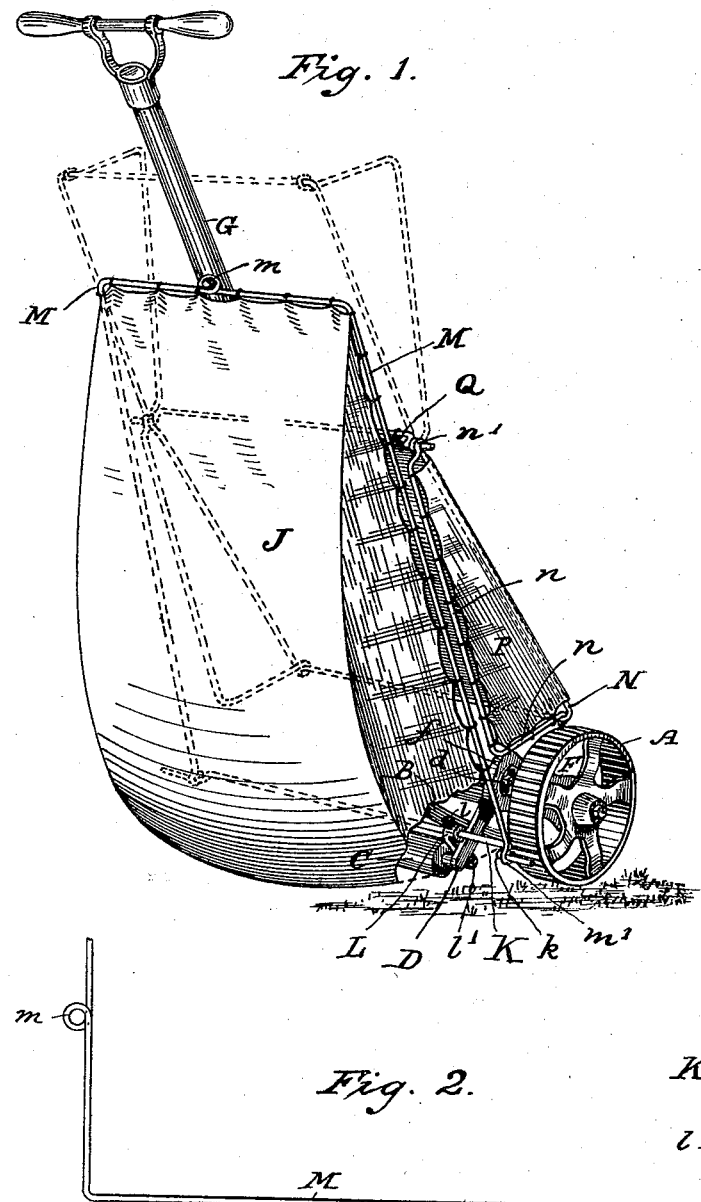
Witnesses
F. S. Berry
Mo Swenson
Inventor
Charles W. Wheeler.
By his Attorney J. B. Thurston

UNITED STATES PATENT OFFICE.

CHARLES W. WHEELER, OF CLAREMONT, ASSIGNOR OF ONE-HALF TO FRANCIS A. CUSHMAN, OF PLYMOUTH, NEW HAMPSHIRE.

ATTACHMENT FOR LAWN-MOWERS.

SPECIFICATION forming part of Letters Patent No. 532,300, dated January 8, 1895.

Application filed July 20, 1894. Serial No. 518,089. (No model.)

*To all whom it may concern:*

Be it known that I, CHARLES W. WHEELER, a citizen of the United States, residing at Claremont, in the county of Sullivan and State of New Hampshire, have invented certain new and useful Improvements in Attachments for Lawn-Mowers; and I do hereby declare the following to be a full, clear, and exact description of the invention, such as will enable others skilled in the art to which it appertains to make and use the same.

Every one who is in the habit of cutting, or mowing his lawn by machine, has experienced the unavoidable difficulty of removing the cut grass, for, if the grass on a lawn is short enough to be cut by a machine, the grass so cut, is too short to be gathered in front of a rake when used in the ordinary way;—but by turning a rake over, and exercising much patience, a lawn may be in this way, scraped, so as to be tolerably free from the cuttings, after repeating the operation several times. This method of removing the cut grass, especially for those who hire their lawns mowed, has proved so expensive that people find it cheaper to have them cut frequently, when the cut grass, being much shorter than it otherwise would be, sinks, for the most part, far enough into the standing grass, as not to mar the beauty of the lawn: but either of the above methods involves so much expense that the majority who use lawn mowers, allow the cut grass to remain where it falls, and becoming dried in the sun, is conspicuously noticeable for several days, or, until the standing grass has grown sufficiently to hide it from view.

The object of my invention is to overcome the difficulties previously encountered by those who desire the cuttings removed when their lawns are mowed.

My invention will be fully set forth in the following specification and claims, and clearly illustrated in the accompanying drawings, forming part of the same, of which—

Figure 1, is a perspective view of a lawn mower having my improved attachments applied thereto; Fig. 2, being a detached broken plan view of a portion of my improvements.

Similar reference-letters denote corresponding parts in each view.

A, is the driving wheel of an ordinary lawn mower. B, represents its rotary cutter.

C, is the gage-roll, which is journaled at its ends in a bar D, adjustably connected at $d$, within a slot formed for the purpose in the projection $f$, of the frame F, by which construction said gage-roll may be adjusted as required.

G, is the handle-bar, which is connected in the ordinary way to the frame F. To carry my invention into effect, a receptacle of some suitable form is suspended from a point on this handle-bar G, to a point just back of or above the gage-roll C, into which the cut grass will be thrown by the rotary cutters, while the machine is in operation.

The receptacle J, may be made of metal, wood, fiber of any kind, or of any suitable cotton fabric, as desired, and the manner of attaching it to the machine is by no means material;—the essential feature consisting simply in providing a detachable receptacle capable of catching the cuttings thrown up by a lawn-mower.

In the drawings I show a wire K, supported by a pair of arms L, having a lateral cylindrical projection through which said wire passes, and capable of adjustment thereon by means of a set-screw $l$, and having at their opposite ends a lateral projection $l'$, between which projections said bar D, will rest.

The wire K, is secured in its proper position by placing the arms L, close to the bars D, in such manner that the latter may rest between the projections of the former, and then tightening the set-screw $l$, and a piece of cloth attached at one end to said wire, and at the other, to a cross bar secured to the handle-bar G, would serve a good purpose for a receptacle J, but in order to support the sides of such receptacle, I show in the drawings a wire frame M, the central upper portion of which may be attached at $m$, in any convenient manner to the handle-bar G, the lower ends of said frame being perforated or bent, so as to form an eye $m'$, which ends may be spread apart sufficiently to be sprung onto the ends of the wire K, resting normally against the offsets $k$ which retains the frame in place.

Quite an important feature of my invention is, the shield or guard which I attach to the forward side of the handle-bar.

With a strong wind blowing, a large part of the cut grass is blown so far to either side as to be out of range of the receptacle, and thus falls back onto the lawn. Such a result would act as a serious drawback, if not actually prevent the success of my invention. To obviate any such difficulty I provide a guard or deflector, consisting of a wire frame N, which may be bent down at its sides as at $n$, and a cloth or other suitable covering P. The frame should be detachably connected to the machine for the convenient dumping of the receptacle J. To this end, I show eyes $n'$, at each upper end of the frame N, (which may be made of a single piece of wire) said eyes being mounted upon the ends of a cross-bar, or wire Q, which is secured at the proper point to the front, or upper side of the handle-bar I, thus forming a hinged connection whereby said guard, or deflector, may be conveniently raised or turned up, when it is desired to dump the receptacle, (as seen in dotted lines, Fig. 1,) or it may be removed altogether.

When the receptacle is filled, it can be dumped at one side of a lawn, and thus the mowing, and raking, is accomplished at one and the same time.

Having described my invention, what I claim is—

1. In a mowing machine, a rod provided with offsets near each end and connected to the mowing-machine frame directly back of the cutters, a wire frame having eyes at its ends adapted to receive the offset portions of said rod and attached at its top to the handle-bar, and a suitable receptacle supported by said rod and frame, and adapted to receive the cut grass.

2. In a mowing machine, a rod provided with offsets near each end and connected to the mowing-machine frame directly back of the cutters, a wire frame having eyes formed at its ends for the reception of the offset portions of said rod, the ends having the eyes being adapted to spread apart for attachment to the rod, said frame being attached at its top to the handle-bar, a suitable receptacle supported by said rod and frame, and a deflector, pivotally mounted upon a horizontal rod attached to the forward part of the handle-bar for directing the stray particles of cut grass into said receptacle.

In testimony whereof I affix my signature in presence of two witnesses.

CHARLES W. WHEELER.

Witnesses:
STEPHEN F. ROSSITER,
CLARENCE M. LUTZ.